US010733801B2

(12) United States Patent
Corso et al.

(10) Patent No.: US 10,733,801 B2
(45) Date of Patent: *Aug. 4, 2020

(54) MARKERLESS IMAGE ANALYSIS FOR AUGMENTED REALITY

(71) Applicant: A9.com, Inc., Palo Alto, CA (US)

(72) Inventors: Nicholas Corso, Emeryville, CA (US); Michael Patrick Cutter, Mountain View, CA (US); Yu Lou, Mountain View, CA (US); Sean Niu, San Francisco, CA (US); Shaun Michael Post, San Mateo, CA (US); Colin Jon Taylor, Orinda, CA (US); Mark Scott Waldo, Richmond, CA (US)

(73) Assignee: A9.com. Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/384,059

(22) Filed: Apr. 15, 2019

(65) Prior Publication Data

US 2019/0236846 A1  Aug. 1, 2019

Related U.S. Application Data

(63) Continuation of application No. 15/590,889, filed on May 9, 2017, now Pat. No. 10,339,714.

(51) Int. Cl.
*G06T 19/00* (2011.01)
*G06K 9/00* (2006.01)
*G06Q 30/06* (2012.01)

(52) U.S. Cl.
CPC ........ *G06T 19/006* (2013.01); *G06K 9/00671* (2013.01); *G06Q 30/0623* (2013.01); *G06Q 30/0643* (2013.01)

(58) Field of Classification Search
CPC .............. G06T 19/006; G06K 9/00671; G06Q 30/0623; G06Q 30/0643
See application file for complete search history.

(56) References Cited

U.S. PATENT DOCUMENTS 9,723,293 B1  8/2017  Cederlof
10,032,276 B1  7/2018  Liu
(Continued)

FOREIGN PATENT DOCUMENTS

WO  2013/167901  11/2013
WO  2018/175335  9/2018

OTHER PUBLICATIONS

GB Search Report dated May 19, 2019 issued in GB Application Serial No. 1086658.9.
(Continued)

*Primary Examiner* — Sarah Lhymn
(74) *Attorney, Agent, or Firm* — Hogan Lovells US LLP

(57) ABSTRACT

Systems and methods for a markerless approach to displaying an image of a virtual object in an environment are described. A computing device is used to capture an image of a real-world environment; for example including a feature-rich planar surface. One or more virtual objects which do not exist in the real-world environment are displayed in the image, such as by being positioned in a manner that they appear to be resting on the planar surface, based at least on a sensor bias value and scale information obtained by capturing multiple image views of the real-world environment.

20 Claims, 11 Drawing Sheets

(56) References Cited

U.S. PATENT DOCUMENTS

| | | |
|---|---|---|
| 2008/0071559 A1 | 3/2008 | Arrasvuori |
| 2010/0208057 A1 | 8/2010 | Meier |
| 2014/0104445 A1 | 4/2014 | Ramachandran |
| 2014/0123507 A1 | 5/2014 | Gupta |
| 2014/0132633 A1 | 5/2014 | Fekete |
| 2014/0347390 A1 | 11/2014 | Poulos |
| 2015/0022640 A1 | 1/2015 | Metzler |
| 2015/0187133 A1 | 7/2015 | Martini |
| 2016/0055673 A1* | 2/2016 | Broaddus .............. G06T 19/006 345/633 |
| 2016/0253745 A1 | 9/2016 | Lee |
| 2017/0153787 A1 | 6/2017 | Chowdhary |
| 2018/0005393 A1* | 1/2018 | Senthannil ............ G06T 19/006 |
| 2018/0284802 A1* | 10/2018 | Tsai ..................... G05D 1/0246 |

OTHER PUBLICATIONS

GB Search Report dated Oct. 22, 2018 issued in GB Application Serial No. 1086658.9.
GB Publication No. GB2563731.
DE Publication No. DE102018207088.
Requirement for Restriction/Election issued in U.S. Appl. No. 15/590,889 dated Feb. 20, 2018.
Non-Final Office Action issued in U.S. Appl. No. 15/590,889 dated Aug. 9, 2018.
Notice of Allowance issued in U.S. Appl. No. 15/590,889 dated Feb. 20, 2019.

\* cited by examiner

MARKERLESS IMAGE ANALYSIS FOR AUGMENTED REALITY

CROSS-REFERENCE TO RELATED APPLICATION

The present application is a continuation of U.S. patent application Ser. No. 15/590,889, filed on May 9, 2017, and which is incorporated herein by reference in its entirety.

BACKGROUND

The proliferation of mobile computing devices and the increase in graphics processing capabilities has resulted in a rise of augmented reality applications. For example, a user may capture image data of a real-world environment and augment that image data with a digital representation, often three-dimensional (3-D), that is "placed" into the real-world environment and which appears to exist in the real-world environment when viewed through the computing device. In some applications, the representation of the object can be viewed in real-time from different angles, just as objects existing in the real-world environment. However, the representation of the object can look out of place or unrealistic in the augmented reality view; for example, the representation may appear to be floating in air or at an inappropriate size when compared to the other objects in the real-world environment being viewed in augmented reality.

BRIEF DESCRIPTION OF THE DRAWINGS

Various embodiments in accordance with the present disclosure will be described with reference to the drawings, in which.

DETAILED DESCRIPTION

Figure 1:
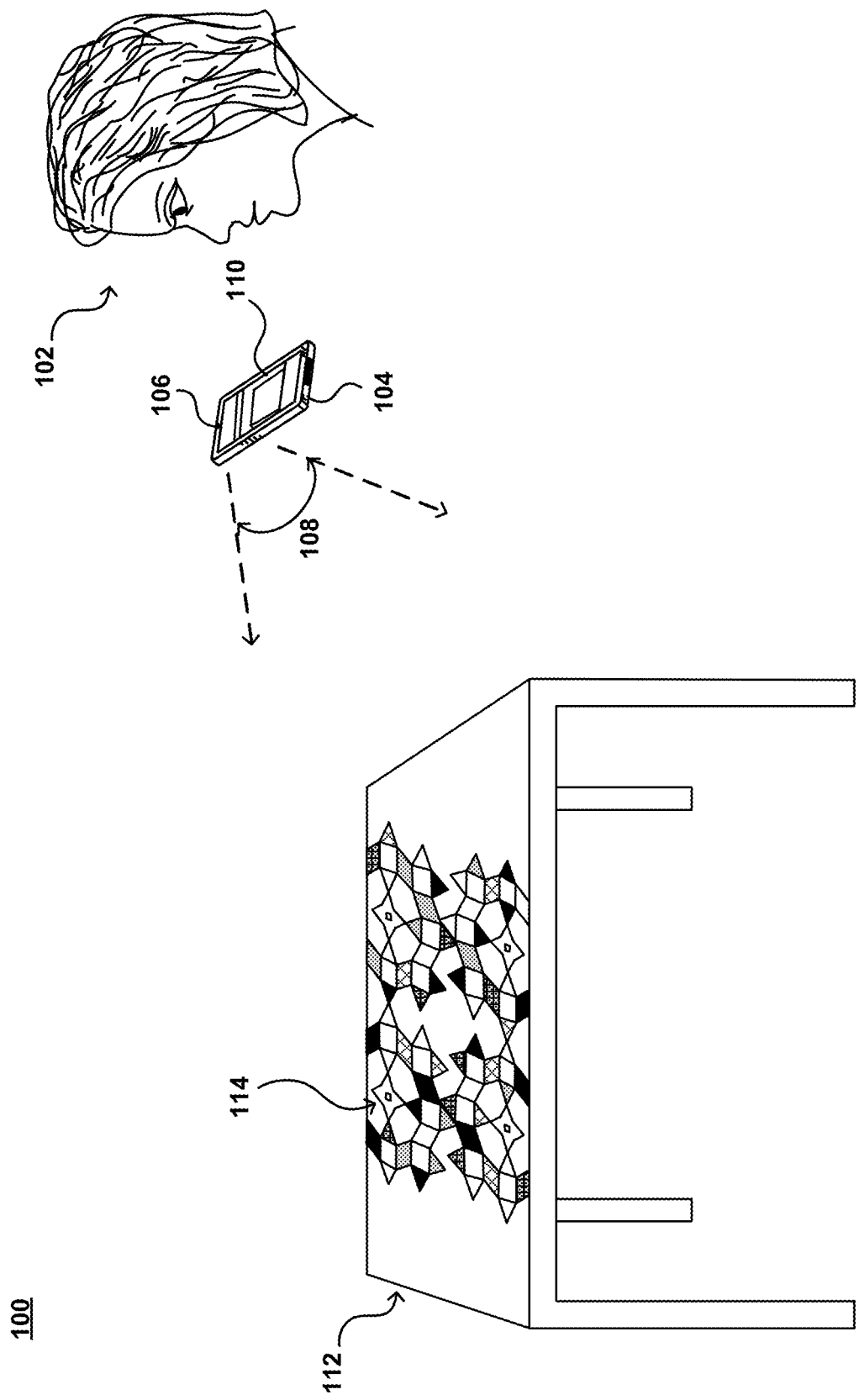
FIG. 1 illustrates an example environment in which various embodiments can be utilized, in accordance with at least one embodiment.

Systems, devices and methods in accordance with various embodiments of the present disclosure may overcome one or more of the aforementioned and other deficiencies experienced in conventional approaches to placing digital representations of objects (e.g., 3-D models, etc.) on a computing display along with image data of a real-world environment being captured by a camera or other image capture device (e.g., augmented reality). For example, an image capture device (e.g., a camera) may capture a stream of image data (e.g., multiple still images, video data, live image data, etc.) of a real-world environment, which is displayed on a display (e.g., a device screen, a monitor, goggles or eyewear that are capable of displaying digital image data to be viewed by a wearer, etc.). Inserted or otherwise "placed" into this image data of the real-world environment are digital representations that do not exist in the real-world environment, but by being displayed along with the real-world environment, can appear to exist in the real-world environment as it is displayed on the computing display. However, specific technical problems are faced in this specific technological environment; for example, if the digital representation of an object placed into the augmented reality view of the real-world environment is not sized or positioned properly, then the augmented reality view of the real-world environment can seem fake and unrealistic. In order to generate a display of a representation of an object in image data of a real-world environment, various data about the real-world environment should be determined; for example, at least the scale and 3-D geometry of objects in the real-world environment. In some cases, a single camera is used to capture the image data representing the real-world environment, which can lead to incorrect data about the scale and 3-D geometry of objects in the real-world environment; for example, there may not be a "marker" in the real-world environment that provides a known scale quantity (e.g., dimensions, measurements such as length, width, etc.) to which objects in the real-world environment are compared in order to determine scale. There may not be an infrared emitter and sensor, or similar device, which evaluates the reflections of emitted light in order to determine dimensions of an object. The initial height at which the camera capturing the real-world environment may not be known, or may change during capture, which can frustrate attempts to estimate scale.

By providing specific technical solutions to specific technical problems faced in the computer-related environment of at least augmented reality and digital image analysis, the techniques described herein improve the computer-related technologies of at least augmented reality and digital image analysis. The techniques described herein improve the operation of computing devices used, for example, in the computer-related technologies of at least augmented reality and digital image analysis by at least reducing the number of additional sensors (e.g., infrared emitters, acoustic emitters, multiple cameras, etc.) required on computing devices. The techniques described herein improve the efficiency of performing the computer-related technologies of at least augmented reality and digital image analysis at least by not requiring data to be gathered and/or stored about a height at which image data is being captured and/or not requiring a marker of known dimensions (e.g., a fiducial, a dollar bill, a printed QR code, etc.) to be acquired and placed in the real-world environment, and then captured by a camera in order to perform accurate rendering of models in the augmented reality environment. These and other specific improvements to the computer-related technologies of at least augmented reality and digital image analysis therefore operate to solve specific technological problems.

In particular, various embodiments herein describe a markerless initiation approach to estimate one or more characteristics (e.g., scale, orientation, etc.) about a real-world environment and objects contained within as part of an approach for rendering a camera view of the real-world environment that includes one or more digital representations of objects (e.g., 3-D models) that appear to exist in the real-world environment as viewed in the camera view. For example, a "markerless" approach means a lack of fiducial or other element (e.g., QR code, dollar bill, etc.) placed into a scene in order to enable augmented reality techniques such as those described herein (e.g., accurate scale representation, etc.). For example, a digital representation (e.g., a virtual object, a model, etc.) can be a graphical depiction and/or representation of a physical object, such as a piece of furniture, a decoration, a piece of art (e.g., sculpture, sketch, painting, photograph, poster, etc.), an appliance, a textile (e.g., rug, curtains, bed sheet, etc.), a wall, a household item, etc.

In an embodiment, a markerless augmented reality (AR) application is initialized by capturing image data of a real-world environment. For example, a user may have a mobile device with an image capture device (e.g., a camera), and begin by taking a picture or video of the real-world environment desired to be "augmented" with digital representations. In an embodiment, the image capture device is capable of receiving a stream of image data (e.g., a live video stream) and displaying the stream of image data on a display (e.g., the mobile device screen, one or more external displays, AR goggles, display-capable eyewear such as glasses or contact lenses, a virtual reality interface, etc.).

In an embodiment, a user of the device communicably connected to the image capture device is prompted to hold the device still. A graphical user interface (GUI) element may be displayed such as a progress bar that indicates that the initialization process has begun. Once the process begins, data is received from various motion detecting devices, such as an inertial measurement unit (IMU) of the device, which may comprise components such as a tri-axis gyroscope, a tri-axis accelerometer, etc., although any number and configuration of such components is envisioned. The motion of the device is monitored, and if the device is determined to have moved more than a threshold amount (e.g., by a reading from the gyroscope exceeding a threshold value, etc.), then the process is paused until the device is still (e.g., any motion of the device detected by the IMU is associated with data values below the threshold) and the user notified (e.g., via a dialog box and the progress bar stopping) that the device was moving too much and to keep the device still. In an embodiment, the process may be aborted if motion of the device cannot be brought to an acceptable level within a certain amount of time, or if the user indicates a selection to cancel the process.

In an embodiment, data is received from the motion detecting components (e.g., an IMU, etc.) during periods where the device is "still." After a minimum amount of time that the device is determined to be "still," values from the one or more motion-detecting components received during all or some of that period are evaluated in order to determine a sensor bias value. For example, values from a gyroscope during a ten-second period of "stillness" are collected and averaged over the ten-second period in order to supply a sensor bias value. Other data analysis approaches to determine a sensor bias value from readings collected from the device are envisioned; for example, a rolling average, a smoothed logarithmic function, comparison to a known distribution in order to determine error bounds, etc.

In an embodiment, after determining a sensor bias value, a user is prompted to point the image capture device at a surface (e.g., a planar surface such as a table, a wall, a painting on a wall, a book on a table, a container, etc.). In an embodiment, a GUI element such as an "area of interest" or "focus area" comprising a subset of a display screen on which the stream of image data being captured from the real-world environment is being displayed is presented to a user in order to allow the user to "place" the desired planar surface in the area of interest for processing. In an embodiment, a user captures image data of the real-world environment and some or all potential planar surfaces are automatically identified and visually indicated in a GUI of a device. In an embodiment, a user captures image data of the real-world environment and provides an indication of a selection of one or more areas of the image data that the user would like to have evaluated for the presence of a suitable planar surface, or identifying a desired planar surface, etc. For example, a planar surface selected by the user will have a digital representation of an object "placed" on it in an augmented reality view, as discussed herein.

In an embodiment, a planar surface in the image data is evaluated for the presence of adequate features. For example, a user may capture image data of the real-world environment that includes a table with a book placed on the table surface. One or both of the table surface and/or book cover may be evaluated by one or more feature detection algorithms (e.g., interest point extraction, regions of interest points, edge detection, ridge descriptor analysis, FAST, MSER, PCBR, etc.) to determine if the planar surface is a feature-rich surface; i.e., a flat object or plane with complex intensity patterns. In an embodiment, the planar surface(s) have at least a minimum threshold set of features in order to be determined to be suitable to proceed.

In an embodiment, additional image data is captured of the feature-rich planar surface. For example, two or more views of the planar surface are captured from two or more positions around the planar surface. These additional images may comprise still images, frames of a live video stream, etc. In an embodiment, a GUI prompt is provided for display that instructs a user to move left or right around the planar surface while keeping the planar surface in view of the image capture device, and the additional image data may be manually or automatically captured.

In an embodiment, once a threshold number of additional images (e.g., still images, frames, etc.) are captured, then a baseline traversed during capture of additional images is determined; for example, the spatial distance between two of the camera views. In an embodiment, by capturing the same object from different distances, positions, angles, and/or views, a multi-view stereo model may be generated that allows an estimation of a 3D geometry of the planar surface. For example, the distance between two or more of the views may be determined as part of (or in addition to) a process whereby a mapping between at least a portion (e.g., one or more pixels of a feature, etc.) of the image information in one view and the same portion of the image information in a second view. For example, a particular portion of image data may be identified (e.g., a set of pixels associated with a distinguishable feature), and a distance that the camera travels between one view of that portion and another view of that same portion may be determined. One way of visualizing the process is to picture a nail being placed at the portion in the real-world and a string being attached from the nail to the camera, and then the camera moving on an arc around the planar surface at the end of the taut string. For example, the 3D geometry may include data indicating a size and/or scale of the planar surface(s), which when evaluated along with the sensor bias value, allows for accurate sizing and rendering of a digital representation into the augmented reality display of the real-world environment in a "camera view" displayed on a device. For example, a camera view of the real-world environment may be displayed that includes a rendering of the real-world environment including the planar surface as captured by an image capture device (e.g., a live video stream), and a digital representation of an object displayed as if the object were sitting on the planar surface, with the digital representation of the object being rendered at a realistic scale in substantially real-time based on the physical dimensions of the actual object and the scale information (e.g., of the planar surface).

In some embodiments, the various embodiments of the present disclosure can improve an online shopping experience for a user. For example, suppose a user is considering purchasing an expensive vase that is available through an online electronic marketplace for placement on a table in her living room. It would be beneficial if the user could, prior to purchase, view the vase on the table without having the vase shipped to her house. Using her computing device (e.g., tablet), the user can now view the table surface and the vase through a computing device's display, without having to place a marker or other fiducial on the table in order to determine an appropriate scale at which to render the vase. Thus, a user can view an object from an electronic marketplace in near-real time by simply pointing their computing device at a marker.

Based on this information (i.e., the information about the planar surface and the information about the real vase), the computing device can determine the size of a virtual representation of the vase to be presented/rendered in a camera view (also referred to as a camera environment) such that the vase is displayed in the camera view, such as with perspective distortion that matches the camera's perspective. The computing device can also detect lighting conditions surrounding the area of the planar surface to replicate those lighting conditions onto the "virtual" vase and the real-world environment displayed in the screen.

In some embodiments, a user interacting with a computing device can access an online marketplace to browse various products. In response to a user's command, a virtual object shown in a camera view can be substituted with another virtual painting, a virtual television, or another virtual object the user may want to view. In some embodiments, more than one virtual object may be displayed, for example, on more than one feature-rich planar surface in image data of the real-world environment captured by a camera, for example. In some embodiments, more than one virtual object can be displayed. For example, a set of three paintings may be displayed in a rendered camera view on a computing device on a single feature-rich planar surface displayed in the real-world environment as displayed in the screen.

In some embodiments, the user can select different objects to determine which object fits best in their home. For example, the user can see a virtual representation on the display of their device of how the vase (or other object) would look on a magazine placed on top of a table. Thus, the user can make a more informed purchase, which may reduce the likelihood that the user returns an expensive vase or other object.

FIG. 1 illustrates an example environment 100 in which various embodiments can be utilized. In the example 100 of FIG. 1, a user 102 is capturing image data (e.g., a live video stream) of a real-world environment including a table 112 and a top surface of the table 114. As discussed herein, the top surface 114 of the table in this example comprises a feature-rich surface that has sufficient entropy such as gradient, pattern, texture, etc., such that it can be uniquely understood (e.g., recognized by computer vision techniques) from different views of the same surface. In an embodiment, the table surface 114 may be feature-rich, as well as other items placed on top of the surface, such as illustrated in subsequent figures. The user 102 is capturing the image data using a mobile computing device 104 that has a camera 106, by placing the table 112 and surface 114 in the field of view 108 of the camera 106. The image data is being displayed on a screen 110 of the computing device 104; for example, a real-time or near-real-time rendering of the image data being captured by the camera 106, which in this example would be of the real-world environment including the table 112 and surface 114. Although a portable computing device 104 (e.g., a smart phone or tablet computer) is shown, it should be understood that various other types of electronic devices that are capable of determining and processing input can be used as well in accordance with various embodiments. These devices can include, for example, notebook computers, personal data assistants, e-book readers, cellular phones, video gaming consoles or controllers, smart televisions, set top boxes, a wearable computer (e.g., a smart watch or glasses), and portable media players, among others.

Figure 2A:
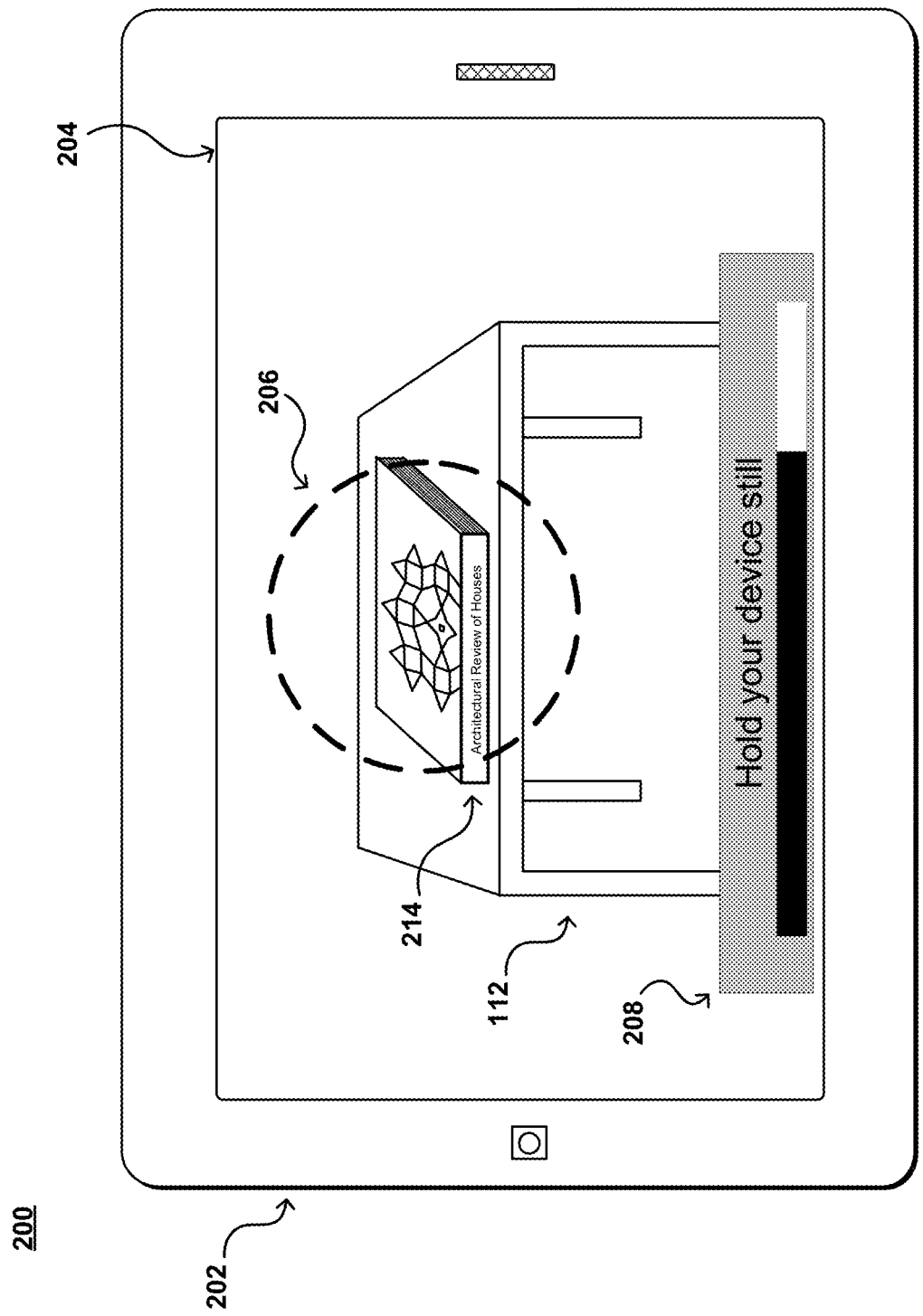
FIG. 2A illustrates an example embodiment for markerless image analysis, in accordance with at least one embodiment.
Figure 2B:
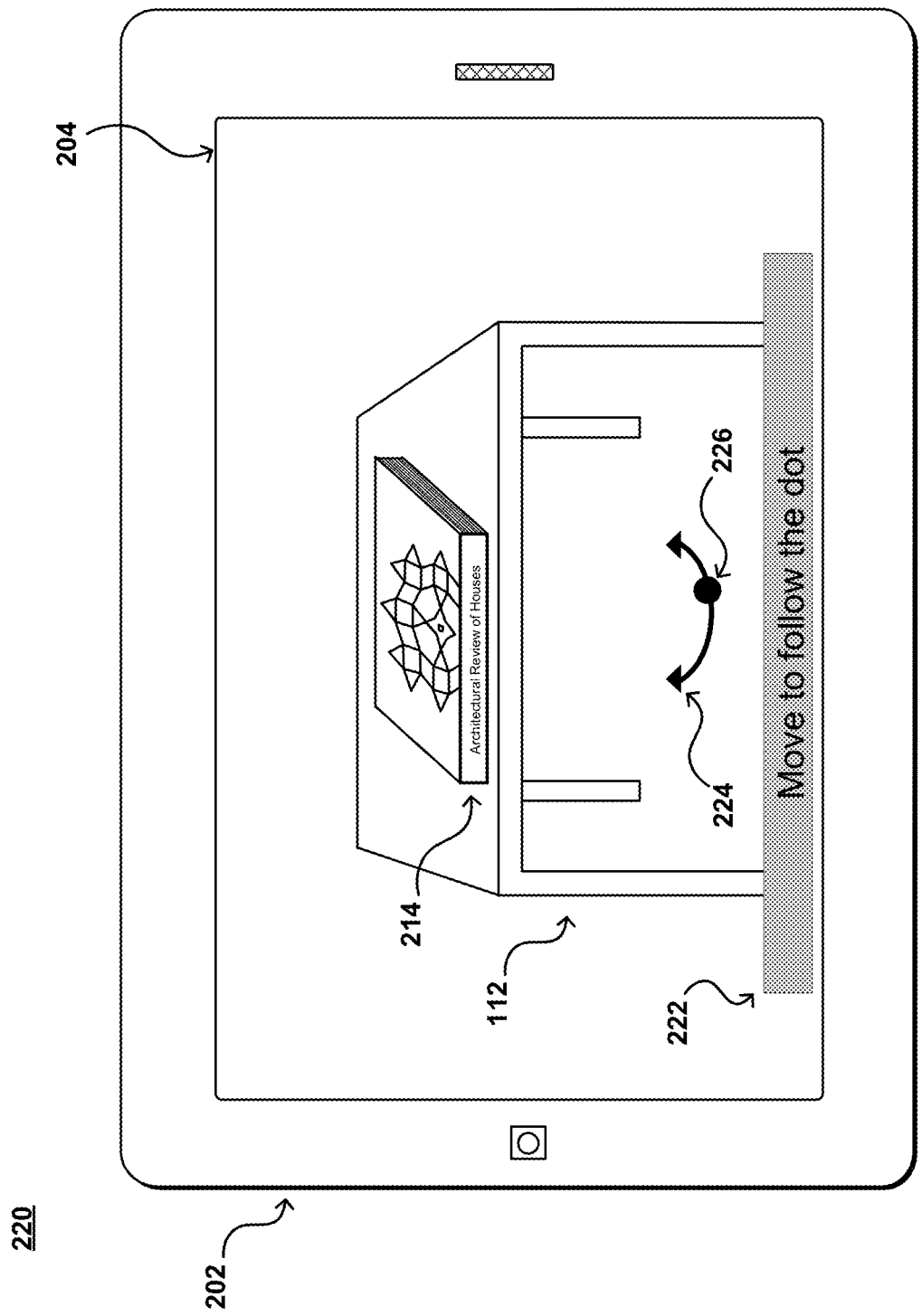
FIG. 2B illustrates an example embodiment for markerless image analysis, in accordance with at least one embodiment.

FIGS. 2A and 2B illustrate example embodiments for markerless image analysis, in accordance with at least one embodiment. It should be understood that reference numbers may be carried over between figures for similar components for purposes of explanation, but that such use should not be interpreted as a limitation on the various embodiments. In the example 200 of FIG. 2A, image data being captured by a mobile computing device 202 of a real-world environment including the table 112 and a book 214 (having a planar surface such as a cover) is being displayed in substantially real-time on the display 204 of the device 202. In an embodiment, a determination of a potential sensor bias value is made. The computing device 202 in this example has an IMU comprising a tri-axis accelerometer and a tri-axis gyroscope; however, in various embodiments, any number and/or configuration of motion- and location-detecting sensors may be utilized. In practice, some devices may have an inherent "bias" or "noise" in their measurements; for example, a device with an IMU may be placed on a table such that the device is not moving, but the IMU may still report a tiny amount of movement. This can be because devices such as gyroscopes and/or accelerometers may have a slow-moving bias that can be caused by or exacerbated by temperature fluctuations of the computing device, for example. By evaluating fluctuations of values reported by these types of devices during a period when the device may be considered "still," then a sensor bias value may be determined that in various embodiments can be utilized to compensate for very small distortions in measured movement of the device.

In an embodiment, a determination is made using sensor data (e.g., values from an accelerometer, gyroscope, etc.) whether the device 202 has been "still" for a threshold amount of time. For example, in an embodiment, a threshold level of "stillness" is indicated as an acceleration value reported by the accelerometer below a particular threshold value, and/or a number of units of rotational velocity reported by the gyroscope below a particular threshold value. If those particular threshold values are not exceeded for a threshold amount of time, then the process can be considered complete and a sensor bias value computed. In an embodiment, if the particular threshold values are exceeded, then the process may be paused until the values as reported are again below the particular threshold values, at which time the threshold amount of time will continue elapsing, or cancelled such that a new threshold amount of time will begin once the device is "still" or upon an indication by the user that they are ready to begin again. In an embodiment, a determination of "still" vs. "moving" is a binary determination, while in an embodiment, various degrees of "stillness" may be contemplated in order to modify the described techniques; for example, using numerical or percentage indicators, a "partially still" vs. "mostly still" descriptor, etc.

In an embodiment, if the threshold amount of time the device is to be kept "still" is ten seconds, then various sensor data values are recorded during the total of ten seconds while the device is determined to be still as described above. For example, the ten second threshold may be reached in ten seconds, or may take 20 seconds, with the process stopping for a total of ten seconds while the device is not considered "still." For the stoppage time, in an embodiment, the sensor data values are not kept or used in the ultimate calculation of a sensor bias value.

In an embodiment, the sensor data values during the threshold time of "stillness" are utilized in a calculation of a sensor bias value. For example, the values captured during the threshold duration may be averaged (e.g., sum up all values and divide by number of values, etc.) overall, over time, etc. In an embodiment, various other statistical measures may be utilized in order to arrive at a sensor bias value; for example, smoothing techniques, rolling averages, weighted averages, margin of error calculations, etc.

In an embodiment, a GUI element 208, such as a status bar and explanatory text, is displayed on the display 204 as an indication to a user that they should hold the computing device 202 still for a threshold amount of time. For example, the GUI element 208 could have a status bar that indicates how long the user has maintained the device 202 at a requisite level of "stillness," as discussed herein, as well as how much longer remains of the threshold time. The GUI element 208 may also indicate additional information, such as how close the device is to being considered "not still," a direction in which movement that exceeds the threshold limit is being detected, messages on the display indicating percentages of "stillness," etc. Tactile feedback may also be provided; for example, a device may vibrate if the threshold limit of motion whereby the device is not considered "still" is reached, etc. In an embodiment, instead of holding the computing device 202, a user may simply place the computing device 202 on a surface as part of the determination of the sensor bias value.

In an embodiment, after the calculation of the sensor bias value, an area of interest 206 is displayed on the display 204 that allows a user to select a potential surface (e.g., a planar surface, etc.) as an area of interest (e.g., a region of interest) for a digital representation of an object to be "placed" in the augmented reality/camera view. In alternate embodiments the step of calculating the sensor bias value may be included with the surface selection step discussed infra, or may be a separate step before or after the surface selection step. For example, if the user desires a digital representation of an object to be displayed as if it were resting on top of the book 214, then the user may include the book 214 (e.g., the planar surface that is the book's cover) inside the area of interest 206 to indicate that the user desires this surface to be evaluated for a requisite number of features. Similarly, the user may place the table surface 114 from FIG. 1 in the area of interest.

In an embodiment, a feature-rich surface is a surface that has sufficient entropy such as gradient, pattern, texture, etc., such that it can be uniquely understood (e.g., recognized by computer vision techniques) from a different view that is of the same surface. As an example, a blank white or solid color wall that is low in entropy will result in a scenario where image recognition and computer vision techniques cannot differentiate image data of one point on the low-entropy surface captured from a certain view from image data of the same point acquired from a different view. Some surfaces may have areas of high variability but still be poorly capable of such recognition; for example, a checkerboard pattern wall, a striped wall, etc. A magazine or book with a graphic cover is one example of a high-entropy feature-rich surface, as it is highly unlikely that there would be an exact copy of the same magazine or book cover in the environment placed at the same angle or orientation. While a blank white refrigerator door may not be suitable, if the door had a visually distinguishable magnet attached to it, then the techniques described herein may be accomplished.

In an embodiment, the target surface indicated by the area of interest 206 is evaluated for a threshold amount/level of features. For example, by using various feature detection techniques on the image data including the representation of the target surface, it may be determined whether the target surface has enough interesting features to proceed; i.e., whether the target surface contains at least a minimum threshold set of features. These features may be of one or multiple types, individually or in combination. For example, a target surface may have a combination of gradient and texture that provides at least a minimum set of distinguishable image features whereby the next steps in the process may be completed.

In an embodiment, only a subset of the image data being captured is evaluated for a planar surface with at least a minimum threshold acceptable number/level of distinguishable features; i.e., the image data corresponding to one or more areas of interest 206. In an embodiment, the entire image stream is evaluated, such as on a substantially real-time basis, for potential planar surfaces with at least a minimum threshold acceptable number/level of distinguishable features. For example, a user may capture image data of a real-world environment that has multiple planar surfaces. In an embodiment, each planar surface that has at least a minimum threshold acceptable number/level of distinguishable features would be identified and indicated as such; for example, by visually highlighting on the display those planar surfaces that were determined to be visually distinguishable. In an embodiment, a user may indicate a selection of one or more potential planar surfaces in order to initiate an evaluation of the selected surfaces for adequate levels of distinguishable features. In an embodiment, a user may provide indications of input to select a particular surface in the real-world environment, as represented in the image data, on which to "place" a digital representation of an object in the rendered camera view. For example, a table may have two magazines on it. A user may capture image data of the real-world environment and the two magazines are identified as sufficient planar surfaces, automatically or in response to user input. The user may then select one of the magazines, such as by touching the desired planar surface on a touch-sensitive display on which the image data of the real-world environment is being displayed, and the selected magazine will have a digital representation of an object "placed" on top of it during a subsequent stage.

In an embodiment, a potential planar surface in the image data may be partially evaluated with regard to whether the surface is sufficiently feature-rich, and the user prompted to select the surface for additional processing. For example, as a way to minimize unnecessary processing, only a target planar surface inside the area of interest 206 is "fully" evaluated (e.g., by executing a certain set of feature recognition techniques, which may take up a large portion of processing power, memory, GPU throughput, etc.), while other potential planar surfaces in the larger set of image data are only preliminarily evaluated, such that surfaces that are likely inadequate (e.g., a low-entropy flat white wall) are not provided with a rigorous evaluation by an entire arsenal of feature detection algorithms/techniques, and some planar surfaces are identified as "potential," but without additional evaluation, a conclusive determination is currently not available. A user could then be prompted to place one of the "potential" surfaces in the area of interest 206, which would then automatically or manually initiate a "full" analysis on that surface. The potential surfaces could be visually heighted in a display of image data, as well as visual/tactile feedback provided to "guide" a user to the potential surfaces and initiate a full analysis.

In the example 220 of FIG. 2B, once a target planar surface such as the book cover 214 (or the table surface 114 from FIG. 1, etc.) is identified as having at least a minimum threshold number of distinguishable features, a user is prompted to move around the planar surface while capturing additional image data from different views and/or different positions. For example, a GUI element 224 representing an arc around the surface and a user interface element such as a dot 226 indicating where the user's movement is within the designated arc; however, other embodiments of a GUI element are envisioned within the scope of the disclosed techniques. For example, once the user begins moving around the surface, the dot 226 may be at the center of the arc 224. If the user moves to the right, the dot 226 may also move to the right in a representation of the movement, and vice versa. The dot 226 may move as an indication to the user of a suggested or required direction or amount of movement. For example, the dot 226 may move to the right as an indicator to the user that they should move to the right while capturing additional image data. If the user stops before enough image data has been acquired, the dot 226 could continue to move as a prompt to the user that they too should continue to move. Other visual and/or tactile indicators could accompany the dot 226, such as the marker flashing, a text message being displayed on the screen 222, vibrations activated on the device, etc.

In an embodiment, by capturing additional image data (e.g., a second image and a third image, which may be individual images, frames of video or live image streams, etc.) of the target surface, from different views, then various data about the target surface, such as size, scope, 3-D geometry, distance, etc. may be determined and utilized, for example to scale a digital representation of an object in an augmented reality/rendered camera view. For example, some devices have active sensors for detecting depth, such as infrared emitters, etc. In an embodiment, by inducing movement of a single camera around a real-world environment and acquiring multiple image data instances from different views, a multi-view stereo representation of the scene can be generated. In an embodiment, while capturing additional image data of the planar surface during a movement of the device around the planar surface in the real-world environment, a 3-D representation of the planar surface (e.g., including scale information, etc.) can be generated based at least on the sensor bias value as discussed above and a determination of a metric distance of the movement occurring between two or more of the views at which image data is captured and analyzed.

In an embodiment, one or more points (pixels) of the image data representing the surface is matched between views during its movement through time. For example, a particular pixel in a portion of image data representing a point on the book 214 can be matched to the same pixel in a subsequent portion of image data taken from a different view/position. In this manner, a pixel location of various portions of a surface (corners, etc.) may be known, offering an understanding of a 3-D geometry of a surface. A process of solving where a camera is in a scene as a function of time is "simultaneous localization and mapping (SLAM)," which may be thought of as a nonlinear problem in 3-D without a sufficient initial estimate of position. By making a simplifying assumption that the rotation of a phone is known accurately, the problem may be made linear. For example, knowing a sensor bias of the phone may be utilized in this simplifying assumption, allowing a solution/determination of how the camera moved during a prescribed movement (e.g., around the target planar surface) without having a sufficient initial estimate of position. In order to make the simplifying assumption, as much noise should be eliminated from the position/motion sensors; for example, by knowing the sensor bias, noise may be compensated for.

In an embodiment, a threshold amount of movement around the planar surface is sufficient; for example, a full 360 degree arc may not be required, instead, only a 30 degree arc may be sufficient. A minimum threshold amount of movement may be determined in one embodiment as a function of distance from the camera to the target planar surface/object and the size of the planar surface/object. By determining a metric distance traversed during this portion of the process, scale information and a 3-D model may be generated that can be utilized in order to place an appropriately-scaled digital representation of an object in the rendered camera view.

Figure 3A:
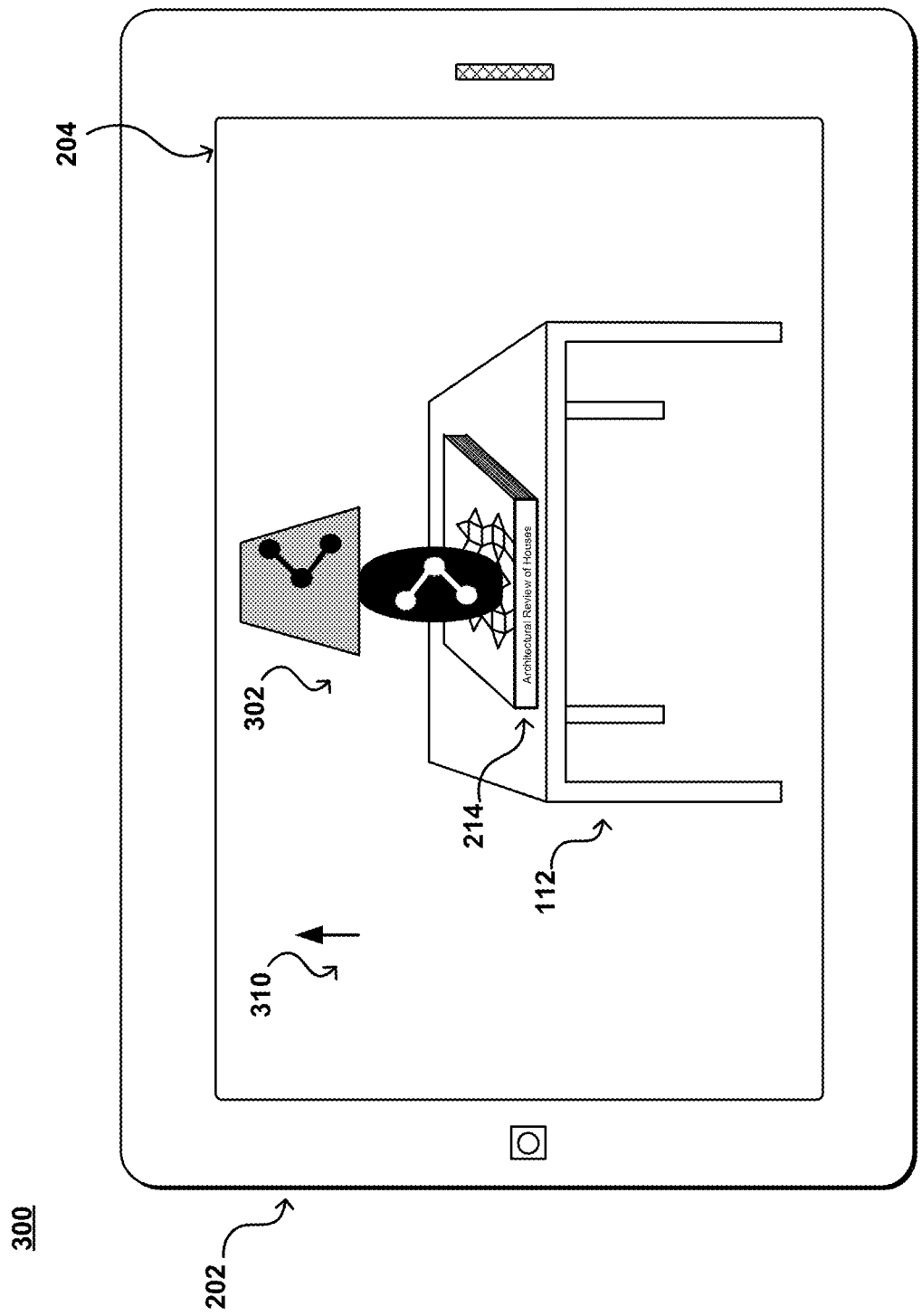
FIG. 3A illustrates an example embodiment for markerless image analysis, in accordance with at least one embodiment.
Figure 3B:
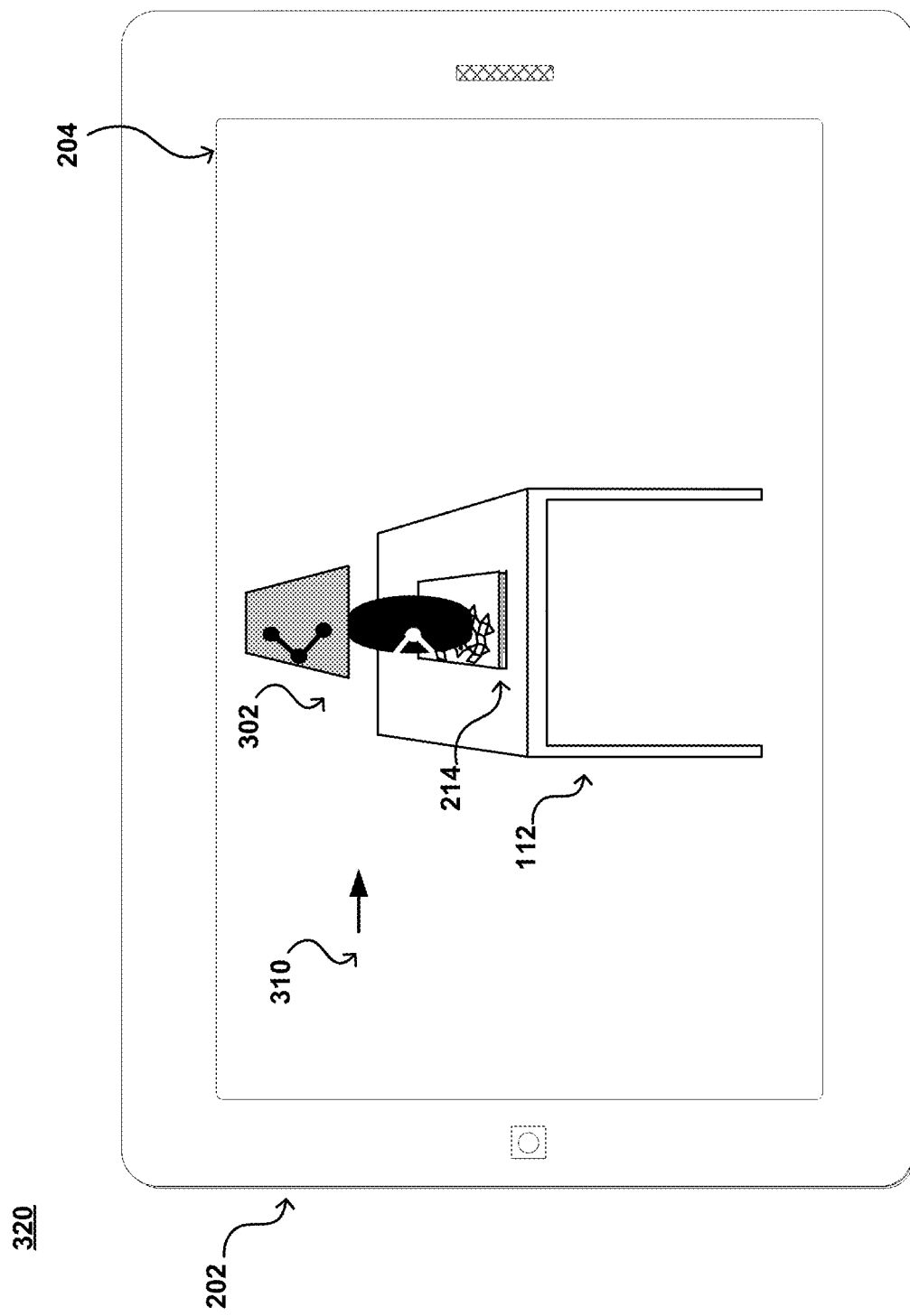
FIG. 3B illustrates an example embodiment for markerless image analysis, in accordance with at least one embodiment.

FIGS. 3A and 3B illustrate example embodiments for markerless image analysis, in accordance with at least one embodiment. In the example 300 of FIG. 3A, an example of a substantially real-time rendering display is shown. In the example 300, the computing device 202 is showing on the display 204 image data of a real-world environment that is being captured by a camera (not pictured). The table 112 and book 214 is in the real-world environment, while the lamp 302 is a digital representation of a real lamp, such as may be available for purchase in an electronic marketplace. The digital representation 302 is shown positioned on the planar surface of the book 214, and is rendered at a size appropriate for the real-world dimensions (e.g., scale) of the table 112 and book 214. As illustrated in FIG. 3A, the device is capturing image data of the real-world environment while facing in a particular direction as indicated by the arrow 310 (which is not part of the display 204 of the image data but merely included for clarity). In the example 320 of FIG. 3B, the user has moved around the real-world environment, including the table 112 and book 214, such that the user and device are now facing a different direction (again as indicated by the arrow 310, which is not part of the display 204 of the image data and is facing in the original direction of view illustrated in FIG. 3A). As the example 320 of FIG. 3B illustrates, the digital representation (e.g., 3-D model) of the lamp 302 is now viewed from a different perspective; i.e., as if the lamp exists in the real-world environment and the user, in moving around the real-world environment, has also moved around the lamp 302. This illustrates a substantially real-time rendering process made possible by the techniques described herein.

Figure 4A:
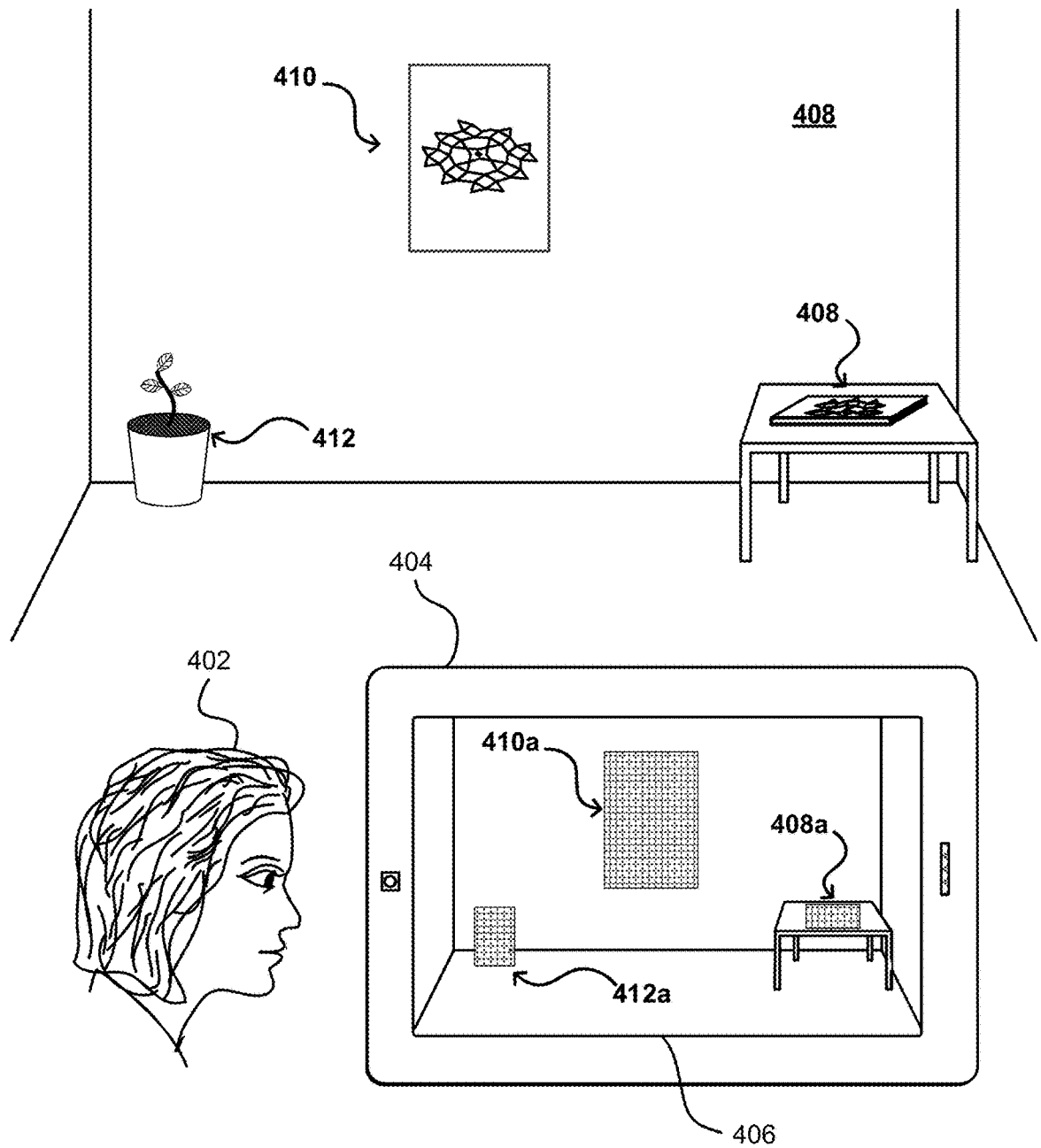
FIG. 4A illustrates an example embodiment for markerless image analysis, in accordance with at least one embodiment.
Figure 4B:
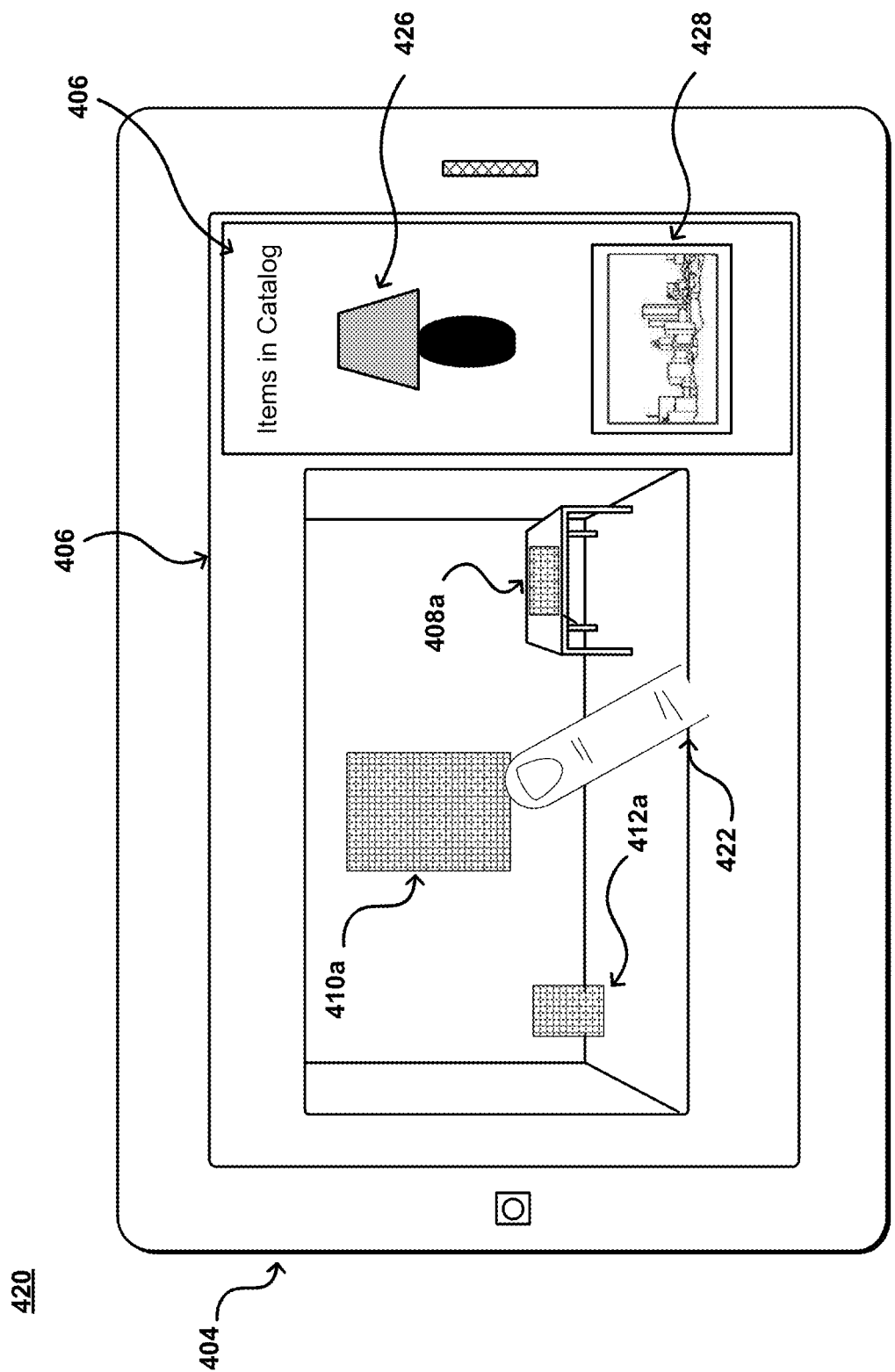
FIG. 4B illustrates an example embodiment for markerless image analysis, in accordance with at least one embodiment.

FIGS. 4A and 4B illustrate example embodiments for markerless image analysis, in accordance with at least one embodiment. In the example 400 of FIG. 4A, a real-world environment 407 is illustrated, in which a planter 412, a painting 410, and a magazine 408 on top of a table is present. A user 402 is using a computing device 404 with an image capture device (not pictured) to capture image data of the real-world environment 407, that is being displayed on a screen 406 of the computing device 404. As discussed earlier, potential planar surfaces in a real-world environment may be automatically determined; for example, in the example 400 of FIG. 4A, the planter 412, painting 410, and magazine 408 have been identified as potential planar surfaces and in the image data displayed on the screen 406, are visually distinguished or otherwise highlighted with visual indicators 408a-412a. For example, a user may select one of the visual indicators 408a-412a in order to perform additional processing on the corresponding planar surface in the image data, or may select one of the visual indicators 408a-412a in order to select the underlying planar surface as the planar surface on which a digital representation of an object will be rendered.

In the example 420 of FIG. 4B, a catalog of objects 424 is displayed; for example, a lamp 426 and a painting 428. In an embodiment, these objects are digital representations (e.g., images) of actual items available in an electronic marketplace, and the digital representations (e.g., models, images, etc.) 426, 428 of the objects comprise uniform resource locators (URLs) that link to a page in the electronic marketplace on which the objects may be viewed, purchased, etc. In an embodiment, a user 422 may select one of the digital representations 426, 428 and "drag" or otherwise manipulate the digital representations 426, 428 to appear in the rendered camera view 406 of the real-world environment 407. The user 422 may select one of the potential planar surfaces (e.g., by selecting a visual indicator 408a-412a) and then select one of the digital representations 426, 428 in order for the selected digital representation 426, 428 to be rendered into the augmented reality camera view 406 of the real-world environment 407 in a manner that associates the selected digital representation 426, 428 with the planar surface (e.g., a 3-D model of the vase 426 is placed on top of the magazine 408, etc.). In an embodiment, multiple digital representations 426, 428 may be "placed" on one or more planar surfaces. In an embodiment, feedback may be provided such that when a digital representation 426, 428 is "dragged" into the augmented reality view 406, the digital representation 426, 428 "snaps" or otherwise automatically is positioned with respect to the selected or nearby planar surface (e.g., a "gravity" effect).

Figure 5:
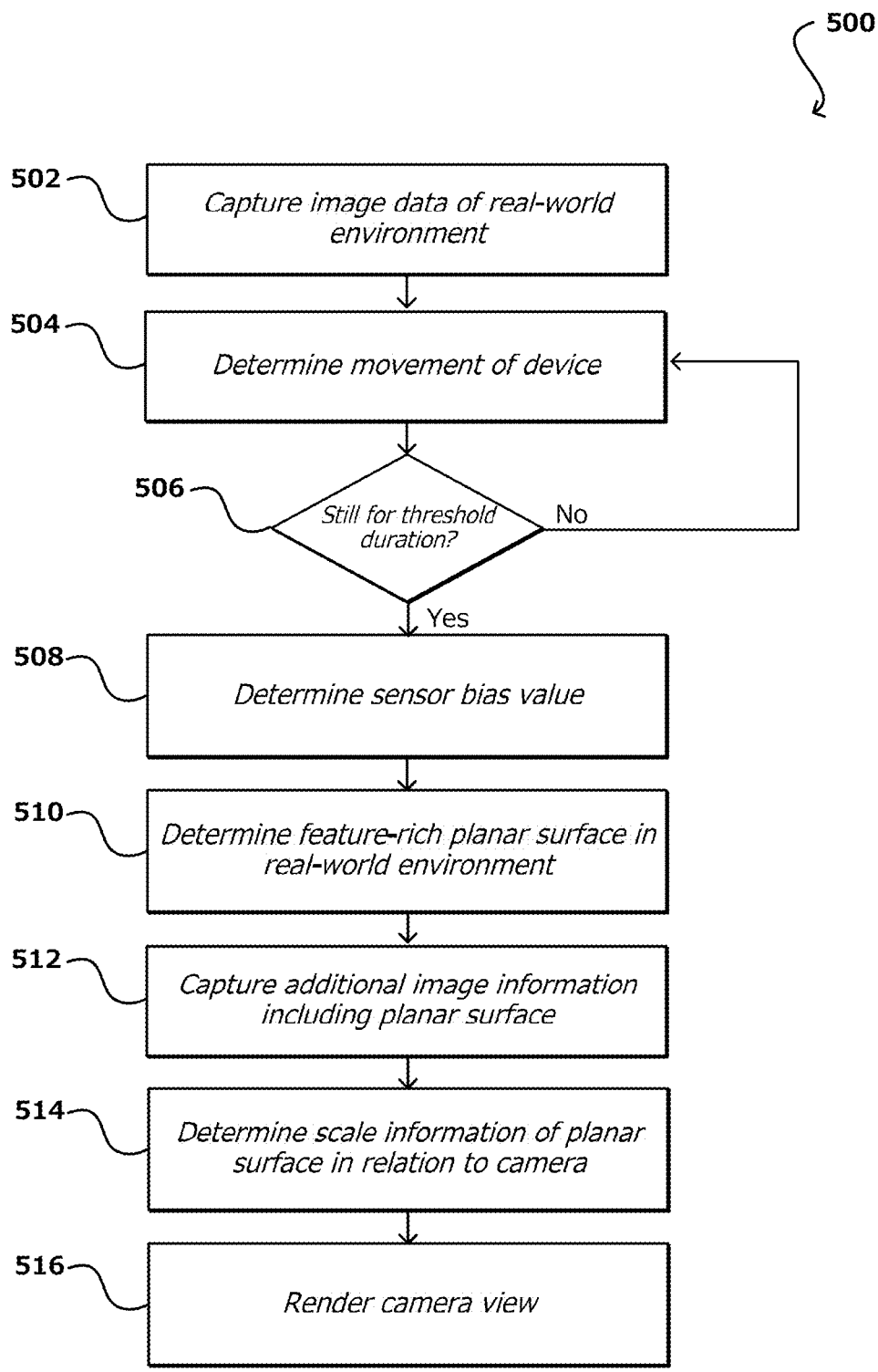
FIG. 5 illustrates an example process for markerless image analysis, in accordance with at least one embodiment.

FIG. 5 illustrates an example process 500 for markerless image analysis, in accordance with at least one embodiment. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In the example 500 of FIG. 5, image data of a real-world environment is captured 502. For example, by using an image capture device of a computing device to capture a stream of image data. Movement of the device is determined 504; for example, whether the device is "still" for a threshold period of time. A determination is made 506 regarding whether the device has remained below a threshold level of movement (e.g., still) for a threshold duration of time. If it has not, then a determination of movement corresponding to the device is continued 504. If the threshold duration is satisfied, then a sensor bias value of the device is determined 508. For example, by averaging sensor data values received over the threshold duration during the device remaining still.

A feature-rich planar surface is then determined 510. For example, a user may indicate a particular planar surface or object in the image data representing the real-world environment, such as by "placing" or "targeting" the planar surface or object in a visual indicator displayed on a screen of the computing device. Additional image information including the planar surface is then captured 512. For example, by taking additional image captures of the planar surface from two or more different views. The image captures may, for example, comprise still images, video frames, real-time image streams, etc. Based at least on the additional image information and the sensor bias value, scale information of the planar surface in relation to the camera may be determined 514. For example, the metric distance traveled by the camera (e.g., user holding the camera) around the planar surface while capturing the additional image data. An augmented reality view may then be rendered 516 based on the information. For example, a digital representation (e.g., a 3-D model) of an object may be inserted/overlaid/merged with the image data representing the real-world environment, such that a substantially real-time rendering of the real-world environment and the digital representation of the object may be presented in a camera view.

Figure 6:
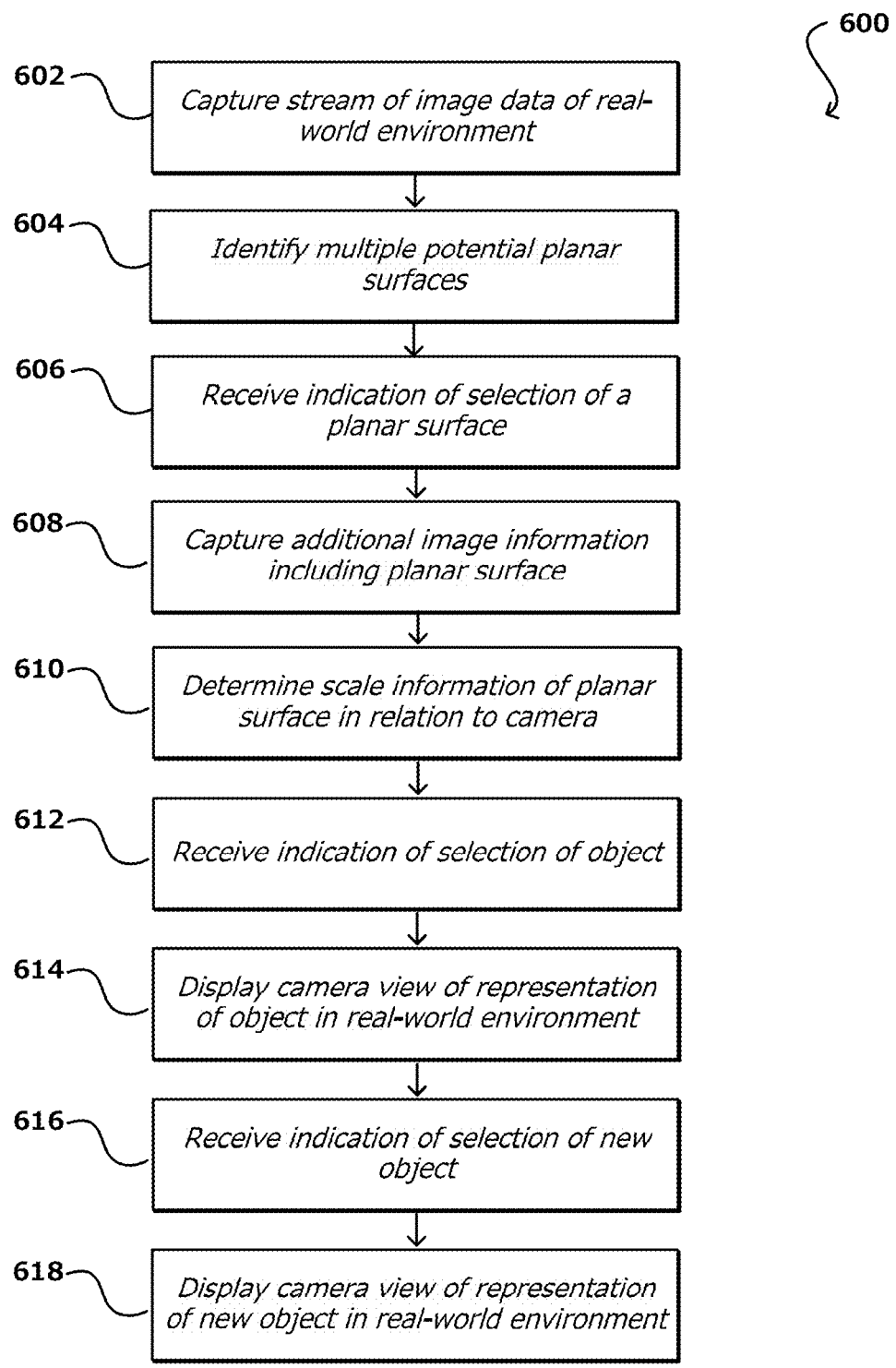
FIG. 6 illustrates an example process for markerless image analysis, in accordance with at least one embodiment.

FIG. 6 illustrates an example process 600 for markerless image analysis, in accordance with at least one embodiment. In the example 600 of FIG. 6, image data of a real-world environment is captured 602. For example, by using an image capture device of a computing device to capture a stream of image data. Multiple planar surfaces are determined 604. For example, in the image data of the real-world environment, there may be several potential planar surfaces that can be identified. An indication of a user selection of one or more of the planar surfaces is received 606. For example, the planar surfaces in the image data may be indicated by a visually distinguishable element, and the user may select (e.g., with a mouse, with their finger, etc.) one or more of the visual indicators, which in turn selects the underlying planar surface.

Additional image information including the planar surface is then captured 608. For example, by taking additional image captures of the planar surface from two or more different views. The image captures may, for example, comprise still images, video frames, real-time image streams, etc. Based at least on the additional image information and the sensor bias value, scale information of the planar surface in relation to the camera may be determined 610. For example, the metric distance traveled by the camera (e.g., user holding the camera) around the planar surface while capturing the additional image data.

An indication of a selection of an object is received 612. For example, a view of objects available for purchase in an electronic marketplace may be displayed on the computing device on which the real-world environment is being displayed. The images representing the objects are displayed, with the images in an embodiment including an associated URL or other reference that links back to the actual object in the electronic marketplace. An augmented reality camera view may then be rendered 614 including a digital representation (e.g., a 3-D model) of the object that is inserted/overlaid/merged with the image data representing the real-world environment, such that a substantially real-time rendering of the real-world environment and the digital representation of the object may be presented in a camera view. A new object is then selected 616. For example, a different mage of an object is clicked on. The camera view (augmented reality view) is then updated 618 with the newly selected object having a digital representation displayed in place of the originally-selected object.

Figure 7:
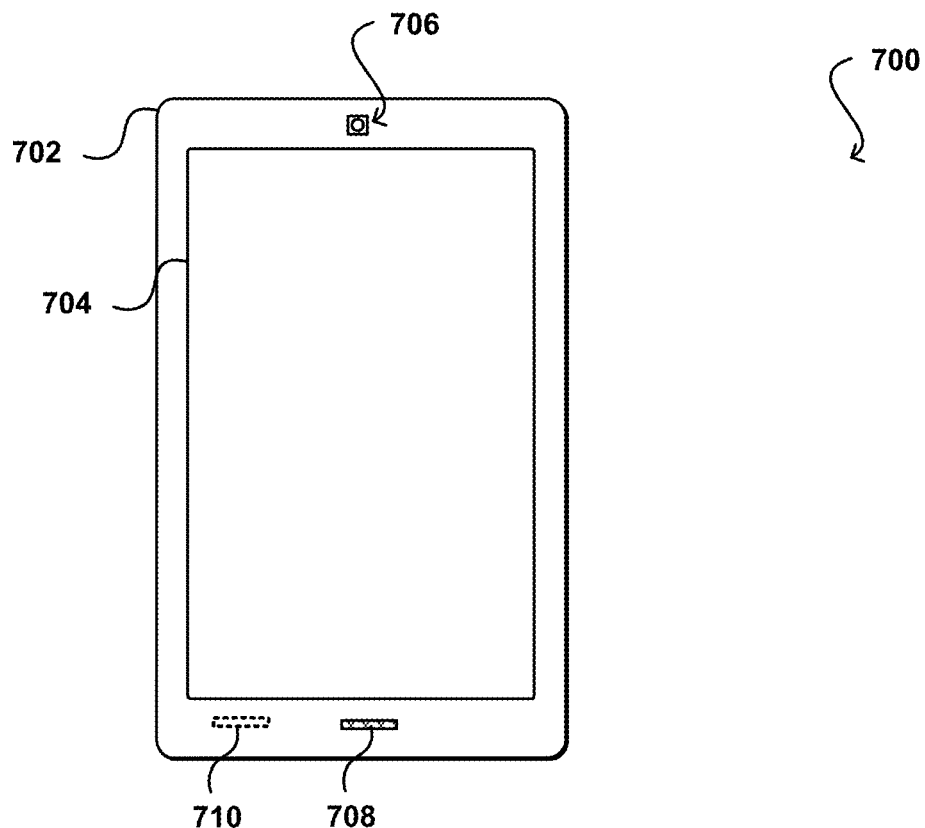
FIG. 7 illustrates an example an example device that can be used to implement aspects of the various embodiments, in accordance with at least one embodiment.

FIG. 7 illustrates an example 700 of an electronic user device 702 (e.g., device 104 in FIG. 1) that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 702 has a display screen 704 on the front side, which under normal operation will display information to a user facing the display screen (e.g., on the same side of the computing device as the display screen). The computing device in this example includes at least one camera 706 or other imaging element for capturing still or video image information over at least a field of view of the at least one camera. In some embodiments, the computing device might only contain one imaging element, and in other embodiments the computing device might contain several imaging elements, such as one on the front side of the device 702 and one on the back side of the device 702. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 702 also includes at least one microphone 708 or other audio capture device capable of capturing audio data, such as words or commands spoken by a user of the device. In this example, a microphone 708 is placed on the same side of the device as the display screen 704, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 702 also includes at least one orientation sensor 710, such as an inertial measurement unit (IMU), which may include one or more position and/or movement-determining elements, although there may be separate elements for these purposes as well. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., on a X-Y axis) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

The example computing device 702 may include at least one touch-sensitive surface, for example coupled to the display screen 704, or the display screen 704 may be a touch-sensitive surface. The example computing device 702 may also include at least one component for detecting touch to the at least one touch-sensitive surface, including at least duration and/or pressure of such touches, as well as at least one component for detecting gestures, for example made by touching the touch-sensitive surface with a finger and moving the finger in a pattern while maintaining contact with the touch-sensitive surface.

Figure 8:
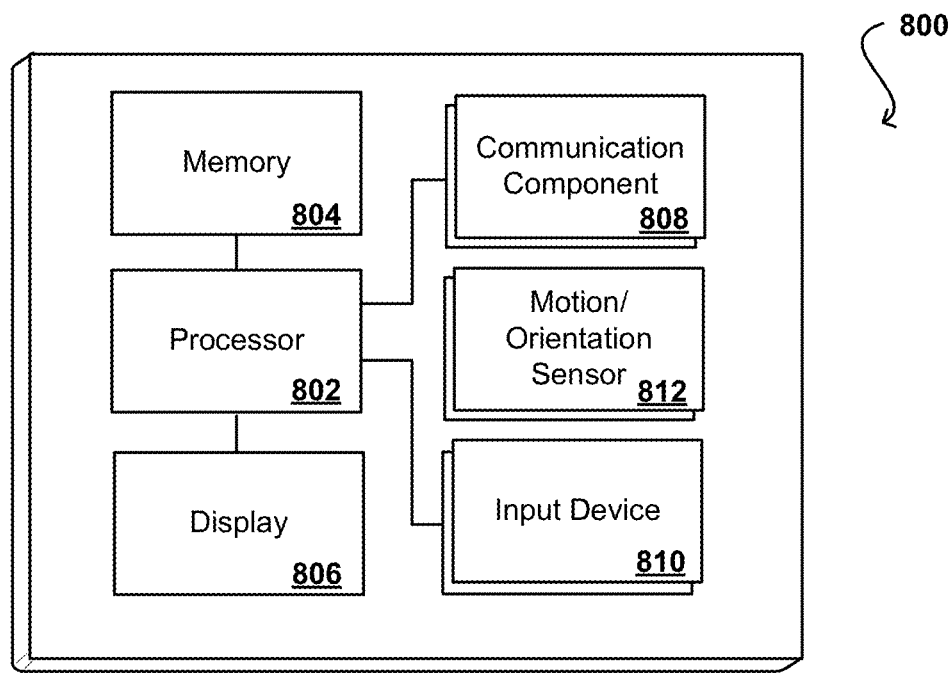
FIG. 8 illustrates an example components of a client device such as that illustrated in FIG. 7, in accordance with at least one embodiment.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element (not pictured) such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component (not pictured), such as a mono or stereo microphone or microphone array, operable to capture audio information from at least one primary direction. A microphone can be a uni-directional or omni-directional microphone as known for such devices.

In some embodiments, the computing device 800 of FIG. 8 can include one or more communication components/elements 808, such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 812. As discussed, such a sensor 812 can include an accelerometer and/or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device such as that described with respect to FIG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 9:
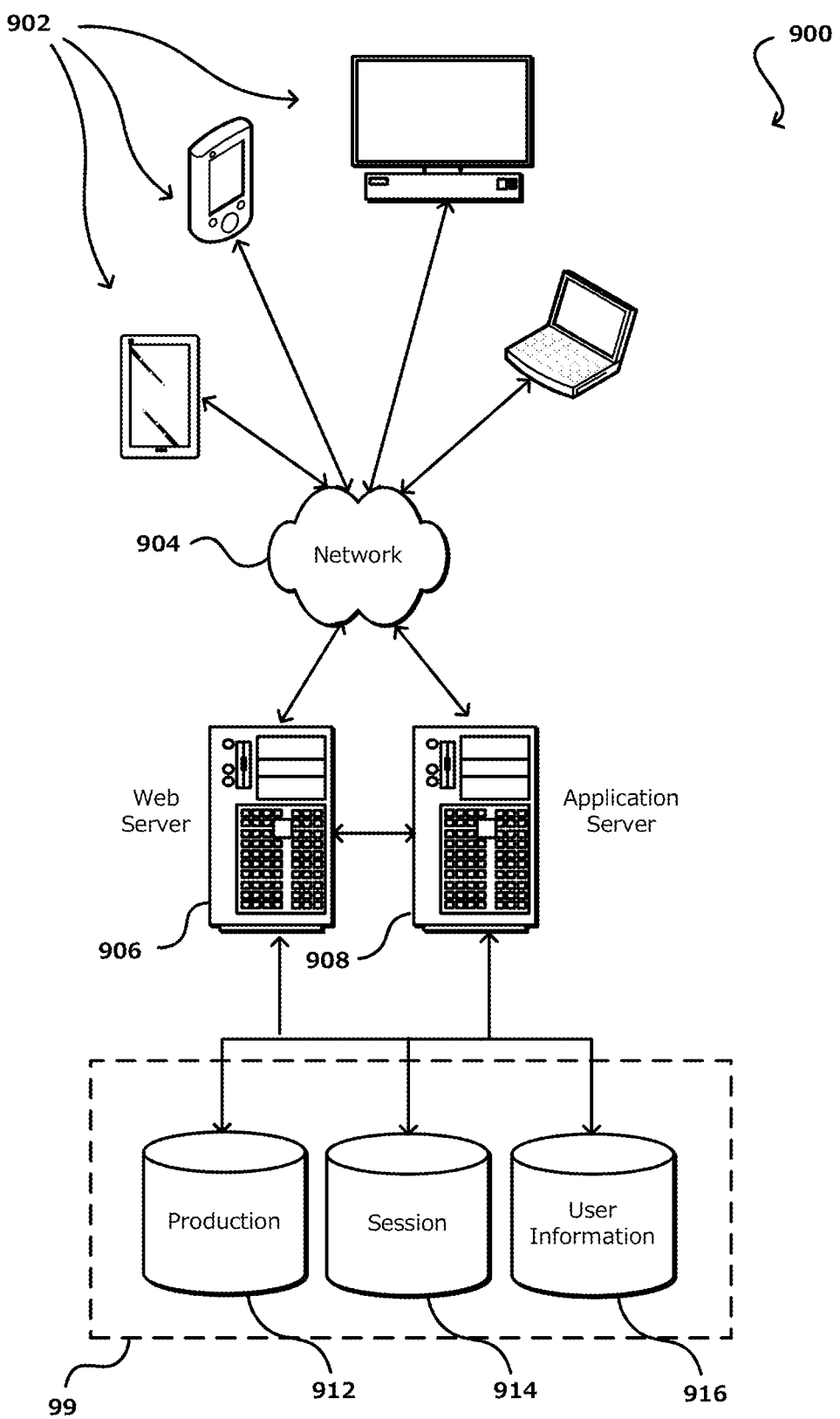
FIG. 9 illustrates an example environment in which various embodiments can be implemented, in accordance with at least one embodiment.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure As discussed above, the various embodiments can be implemented in a wide variety of operating environments, which in some cases can include one or more user computers, computing devices, or processing devices which can be used to operate any of a number of applications. User or computing devices can include any of a number of general purpose personal computers such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks. Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including applets), or both. Further, connection to other computing devices such as network input/output devices may be employed.

Non-transitory storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   determining a sensor bias value associated with at least one sensor of a computing device;
   acquiring, using at least one camera of the computing device, a first image;
   determining a first planar surface represented in the first image;
   acquiring, using the at least one camera, additional image data including different views of the first planar surface;
   determining a distance and orientation of the first planar surface based at least on the sensor bias value and positional data associated with the additional image data;
   determining scale information of the first planar surface in relation to the at least one camera based on the positional data associated with the additional image data and the sensor bias value; and
   displaying a representation of a first object on a screen of the computing device, the representation of the first object appearing to be situated on the first planar surface at a first size in accordance with the determined distance and orientation.

2. The computer-implemented method of claim 1, further comprising:
   displaying a region of interest indicator on the screen;
   determining a portion of the first image corresponding to the region of interest indicator; and
   determining the first planar surface based at least on the portion of the first image.

3. The computer-implemented method of claim 1, wherein the positional data is based on a mapping between at least two portions of the different views in the additional image data.

4. The computer-implemented method of claim 1, wherein the sensor bias value is associated with at least one of an accelerometer or gyroscope of the computing device, and wherein determining a sensor bias value further comprises:
   determining that movement of the device during a first duration of time is below a threshold level;
   receiving, during the first duration of time, sensor data from the at least one of an accelerometer or gyroscope; and
   determining the sensor bias value based at least on an average of the sensor data over at least a portion of the first duration of time.

5. The computer-implemented method of claim 1, further comprising:
   displaying a region of interest indicator on the screen;
   determining a second planar surface corresponding to the region of interest indicator;
   determining that the second planar surface does not have a minimum threshold amount of features in the first planar surface; and
   displaying a visual indication corresponding to the first planar surface,
   wherein the first planar surface did not correspond to the region of interest indicator.

6. The computer-implemented method of claim 1, further comprising:
   determining a second planar surface having a minimum threshold amount of features in the first planar surface;
   displaying a first visual indicator associated with the first planar surface;
   displaying a second visual indicator associated with the second planar surface;
   receiving an indication of a selection of the first object;
   receiving an indication of a selection of the first visual indicator;
   receiving an indication of a selection of a second object;
   receiving an indication of a selection of the second visual indicator; and
   displaying a representation of the second object in the camera view on the screen, the representation of the second object appearing to be situated on the second planar surface at a size in accordance with the determined distance and orientation.

7. The computer-implemented method of claim 1, further comprising:
   receiving the first representation of the first object based on an indication of a selection of a uniform resource locator (URL) corresponding to the first object in an electronic marketplace.

8. The computer-implemented method of claim 1, further comprising:
   determining a second planar surface having a minimum threshold amount of features in the first planar surface;
   acquiring, using the at least one camera, at least a second set of additional image data, the second set of additional image data including different views of the second planar surface;
   determining a second distance and second orientation of the second planar surface based at least on the sensor bias value and positional data associated with the second set of additional image data; and
   displaying a second representation of the first object, the second representation of the first object appearing to be situated on the second planar surface at a second size in accordance with the determined second distance and second orientation,
   wherein the first size and the second size are different.

9. The computer-implemented method of claim 1, wherein the features comprise one or more of gradient, entropy, or patterns.

10. A system, comprising:
    at least one processor; and
    memory including instructions that, when executed by the at least one processor, cause the system to:
    determine a sensor bias value associated with at least one sensor of a computing device;
    acquire, using at least one camera of a computing device, a first image;
    determine a first planar surface represented in the first image;
    acquire, using the at least one camera, additional image data including different views of the first planar surface;

determine a distance and orientation of the first planar surface based at least on the sensor bias value and positional data associated with the additional image data;

determine scale information of the first planar surface in relation to the at least one camera based on the positional data associated with the additional image data and the sensor bias value; and display a representation of a first object in a camera view on a screen of the computing device, the representation of the first object appearing to be situated on the first planar surface at a size in accordance with the determined distance and orientation.

11. The system of claim 10, wherein the instructions when executed further cause the system to:

display a region of interest indicator on the screen;

determine a portion of the first image corresponding to the region of interest indicator; and determine the first planar surface based at least on the portion of the first image.

12. The system of claim 10, wherein at least one of the first image or the additional image data comprises frames of video data captured by the at least one camera.

13. The system of claim 10, wherein the sensor bias value is associated with at least one of an accelerometer or gyroscope of the computing device, and wherein the instructions for determining a sensor bias value when executed further cause the system to:

determine that movement of the device during a first duration of time is below a threshold level;

receive, during the first duration of time, sensor data from the at least one of an accelerometer or gyroscope; and determine the sensor bias value based at least on an average of the sensor data over at least a portion of the first duration of time.

14. The system of claim 10, wherein the instructions when executed further cause the system to:

display a region of interest indicator on the screen;

determine a second planar surface corresponding to the region of interest indicator;

determine that the second planar surface does not have a minimum threshold amount of features in the first planar surface; and display a visual indication corresponding to the first planar surface, wherein the first planar surface did not correspond to the region of interest indicator.

15. The system of claim 10, wherein the instructions when executed further cause the system to:

determine a second planar surface having a minimum threshold amount of features in the first planar surface;

display a first visual indicator associated with the first planar surface;

display a second visual indicator associated with the second planar surface;

receive an indication of a selection of the first object;

receive an indication of a selection of the first visual indicator;

receive an indication of a selection of a second object;

receive an indication of a selection of the second visual indicator; and display a representation of the second object in the camera view on the screen, the representation of the second object appearing to be situated on the second planar surface.

16. The system of claim 10, wherein the instructions when executed further cause the system to:

receive the first representation of the first object based on an indication of a selection of a uniform resource locator (URL) corresponding to the first object in an electronic marketplace.

17. A non-transitory computer-readable storage medium storing instructions that, when executed by a processor of a computing device, cause the computing device to:

determine a sensor bias value associated with at least one sensor of the computing device;

acquire, using a camera of the computing device, a first image;

determine a first planar surface represented in the first image;

acquire, using the camera, additional image data including different views of the first planar surface;

determine a distance and orientation of the first planar surface based at least on the sensor bias value and positional data associated with the additional image data;

determine scale information of the first planar surface in relation to the at least one camera based on the positional data associated with the additional image data and the sensor bias value; and display a representation of a first object in a camera view on a screen of the computing device, the representation of the first object appearing to be situated on the first planar surface at a size in accordance with the determined distance and orientation.

18. The non-transitory computer-readable storage medium of claim 17, wherein the instructions when executed further cause the computing device to:

display a region of interest indicator on the screen;

determine a portion of the first image corresponding to the region of interest indicator; and determine the first planar surface based at least on the portion of the first image.

19. The non-transitory computer-readable storage medium of claim 17, wherein at least one of the first image or the additional image data comprises frames of video data captured by the camera.

20. The non-transitory computer-readable storage medium of claim 17, wherein the instructions when executed further cause the computing device to:

determine that movement of the computing device during a first duration of time is below a threshold level;

receive, during the first duration of time, sensor data from the at least one of an accelerometer or gyroscope; and determine the sensor bias value based at least on an average of the sensor data over at least a portion of the first duration of time.

* * * * *